United States Patent
Kuhlman et al.

(10) Patent No.: US 8,610,841 B2
(45) Date of Patent: Dec. 17, 2013

(54) VOLUMETRIC DISPLAY

(75) Inventors: Frederick F. Kuhlman, Kokomo, IN (US); Daniel Leong, Punggol Field (SG)

(73) Assignee: Delphi Technologies, Inc., Troy, MI (US)

( * ) Notice: Subject to any disclaimer, the term of this patent is extended or adjusted under 35 U.S.C. 154(b) by 241 days.

(21) Appl. No.: 13/283,988

(22) Filed: Oct. 28, 2011

(65) Prior Publication Data

US 2013/0106856 A1 May 2, 2013

(51) Int. Cl.
*G02F 1/1335* (2006.01)

(52) U.S. Cl.
USPC .................. 349/57; 349/15; 349/95; 349/112; 345/426

(58) Field of Classification Search
None
See application file for complete search history.

(56) References Cited

U.S. PATENT DOCUMENTS

| | | |
|---|---|---|
| 7,342,721 B2 | 3/2008 | Lukyanitsa |
| 7,965,448 B2 | 6/2011 | Maekawa |
| 2003/0067460 A1* | 4/2003 | Tomono ........................ 345/419 |
| 2007/0242237 A1* | 10/2007 | Thomas .......................... 353/94 |
| 2010/0265465 A1* | 10/2010 | Kubara et al. ..................... 353/7 |
| 2011/0116049 A1* | 5/2011 | Nayar et al. ...................... 353/7 |

OTHER PUBLICATIONS

Donner, et al.: "Light Diffusion in Multi-Layered Translucent Materials", May 24, 2005, 8 pages.
Nayar, et al.: "3D Volumetric Display using Passive Optical Scatterers", Jul. 2006, 1 page.
National Institute of Information and Communications Technology, ISSN 1349-3531, No. 369, Dec. 2006, 7 pages.

* cited by examiner

*Primary Examiner* — Richard Kim
(74) *Attorney, Agent, or Firm* — Lawrence D. Hazelton

(57) ABSTRACT

A volumetric display for displaying three dimensional (3D) images. The volumetric display uses a flat panel display to output light into a volumetric diffuser, and an array of electrowetting lenses between the flat panel display and the volumetric diffuser to direct light emitted by one or more of the pixels of the flat panel display toward a location within the display volume such that the location is illuminated brighter than other locations within the display volume.

5 Claims, 2 Drawing Sheets

VOLUMETRIC DISPLAY

TECHNICAL FIELD OF INVENTION

This disclosure generally relates to volumetric displays, and more particularly relates to a volumetric display that uses a flat panel display to project light into a volumetric diffuser to form a true three dimensional image.

BACKGROUND OF INVENTION

True three dimensional (3D) displays have been proposed that allow a person viewing the display to walk around the display and view an object being displayed from any angle just as if the object were actually present. However, many of these true 3D displays have complicated rotating mirrors or similar devices that add expense and reduce convenience.

SUMMARY OF THE INVENTION

In accordance with one embodiment, a volumetric display for displaying three dimensional (3D) images is provided. The volumetric display includes a flat panel display, a volumetric diffuser, and an array of electrowetting lenses. The flat panel display includes a two dimensional array of pixels individually operable to emit light. The volumetric diffuser is positioned proximate to the flat panel display and configured to define a display volume. The array of electrowetting lenses is interposed between the flat panel display and the volumetric diffuser. Each electrowetting lens is operable to direct light emitted by one or more of the pixels toward a location within the display volume such that the location is illuminated brighter than other locations within the display volume.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
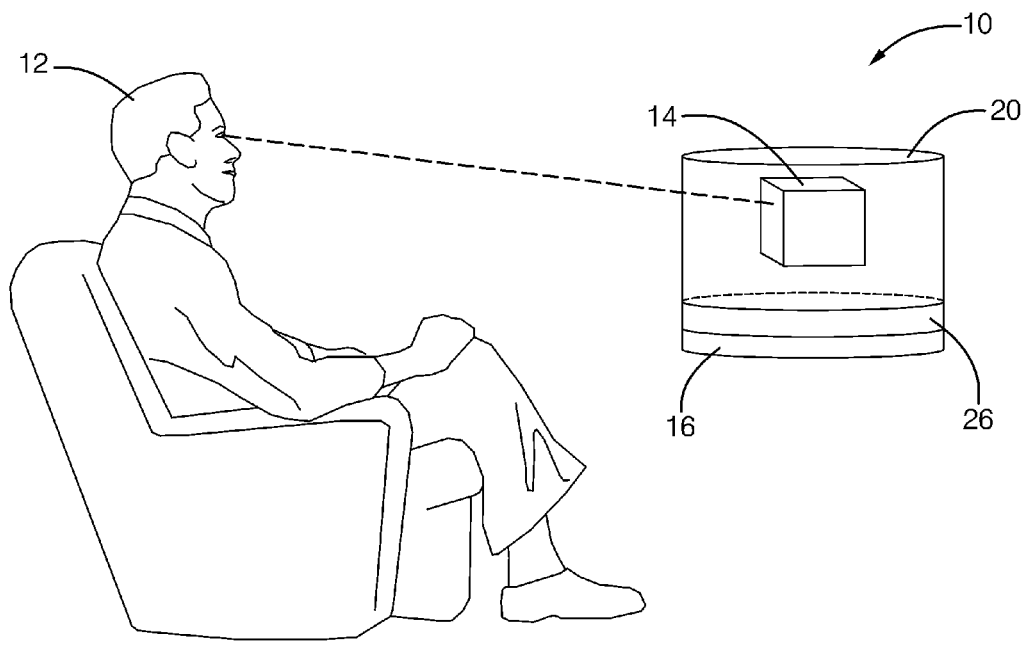
FIG. 1 is perspective view of a person viewing a volumetric display in accordance with one embodiment.

FIG. 1 illustrates a non-limiting example of a volumetric display 10 for displaying three dimensional (3D) images. As used herein, a volumetric display is a graphical display device that forms a 3D image in three actual physical dimensions, as opposed to a simulated 3D image on a planar display like a 3D television display that simulates depth through a number of different visual effects. As will become apparent in the description below, a person 12 viewing the volumetric display 10 when displaying an image 14, for example an image of a cube as illustrated, will be able to move about the volumetric display 10 and view the image 14 from different perspectives just as if the cube was actually present within the volumetric display 10.

Figure 2:
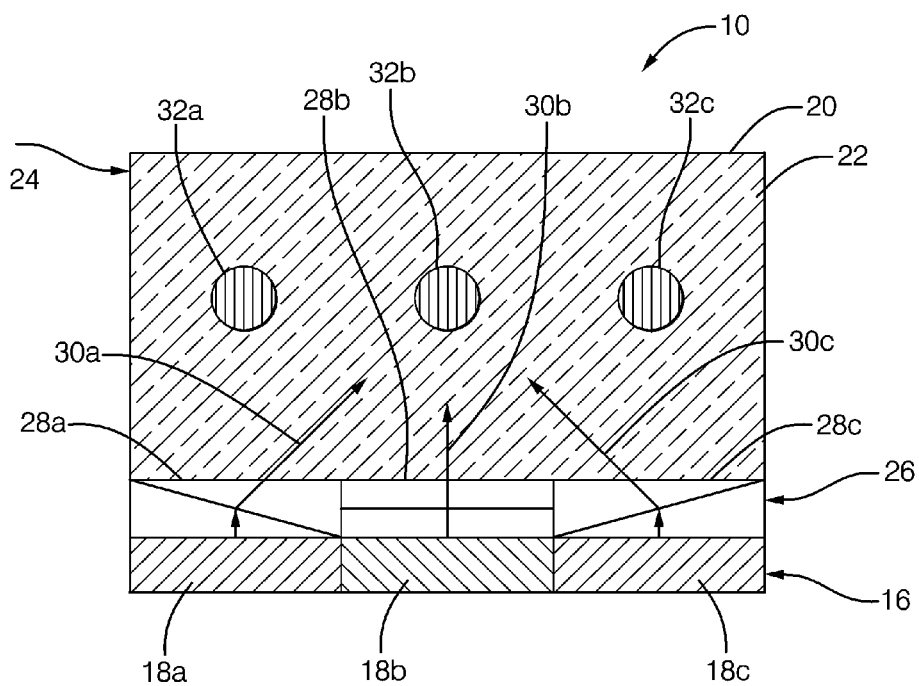
FIG. 2 is a sectional side view of a volumetric display in accordance with one embodiment.

FIG. 2 illustrates a sectional side view of the volumetric display 10 that includes a flat panel display 16. In general, the flat panel display 16 is formed by a two dimensional array of pixels. FIG. 2 illustrates pixels 18a, 18b, and 18c in a one dimensional array only for the purpose of explanation and not limitation. Suitable examples of devices that could be used as the flat panel display 16 include liquid crystal display (LCD) or a light emitting diode display (LED), such as suitably sized active matrix organic light emitting diode display (AMOLED) from the Samsung Corp. The size and resolution of the display is selected based on the performance desired for the volumetric display 10. It should be appreciated that each pixel 18a, 18b, 18c is, in general, individually operable to selectively emit light so an image from the flat panel display 16 can be presented by the volumetric display 10. It should be further appreciated that each pixel may include a red LED, a green LED, and a blue LED so light emitted by any particular pixel may exhibit any color.

The volumetric display 10 also includes a volumetric diffuser 20 positioned proximate to the flat panel display 16 and configured to define a display volume 22. As used herein, a volumetric diffuser is, in general, an object that diffuses light projected into the volumetric diffuser so that points or regions within the volumetric diffuser 20 are illuminated to a degree dependent on how much light is present at the point or region. The non-limiting example of the volumetric display 10 described herein was demonstrated using a volumetric diffuser that included a transparent container 24 formed of glass to define the display volume 22. The transparent container 24 was filled with a solution or mixture of food grade powdered cornstarch suspended in water. However, other suitable materials are contemplated for making the volumetric diffuser 20 such as Aerogel™ available from BuyAerogel.com. Another suitable volumetric diffuser may be formed by laser etching a pattern of diffusion locations within a volume of glass. Such a volumetric diffuser may be provided by Crystal Moments Pte. Ltd., Website: http://search.insing.com/website/3e800200?linkNo=0, Retail branch: VivoCity, #02-83A, 1 HarbourFront Walk, Singapore 098585, or Sentosa Cable Car Station Shop, 42 Imbiah Road, Singapore 099701.

The volumetric display 10 also includes an array of electrowetting lenses 26 interposed between the flat panel display 16 and the volumetric diffuser 20. In general, each electrowetting lens 28a, 28b, 28c is operable to direct light 30a, 30b, 30c emitted by one or more of the pixels toward a location 32a within the display volume 22 such that the location 32a is selectively illuminated brighter than other locations 32b, 32c within the display volume 22. A suitable example of an electrowetting lens is shown in U.S. Pat. No. 7,352,512 to Hendriks et al., titled VARIABLE FOCUS LENS, issued Apr. 1, 2008.

Figure 3:
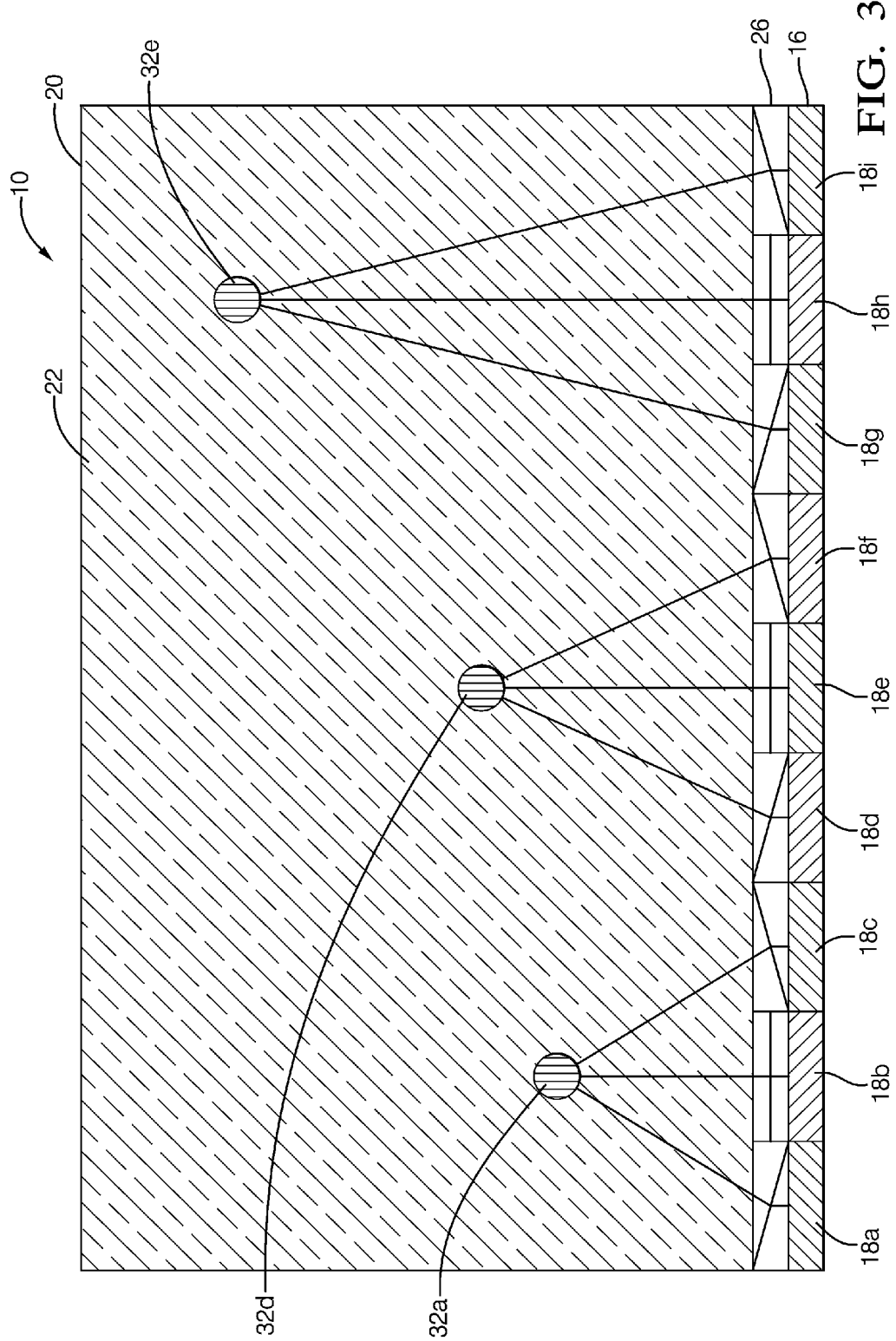
FIG. 3 is a sectional side view of a volumetric display in accordance with one embodiment.

FIG. 3 further illustrates a non-limiting example of how light from various pixels 18a-i can be directed or focused by the array of electrowetting lenses 26 to combine at particular locations (e.g. locations 32a, 32d, 32e) to illuminate those locations to a greater degree of brightness than areas or locations surrounding those particular location. I should be understood that the light from tens or hundreds of pixels may be focused on a single location to brightly illuminate that location.

The following examples are given to further explain, but not limit, how the volumetric display 10 may operate. In one embodiment of the volumetric display 10, the flat panel display 16 and the array of electrowetting lenses 26 may cooperate to simultaneously illuminate a location with light passing through a plurality of electrowetting lenses. By this, a particular location is simultaneously illuminated by many pixels. Alternatively, the flat panel display 16 and the array of electrowetting lenses 26 may cooperate to time-multiplexingly illuminate a location with light passing through a plurality of electrowetting lenses. By this method, the perceived persistence of light at a particular location when viewed by a person may be used so many different locations may be illuminated at various times by various pixels, but the light appears to combine to illuminate one location to greater degree than another.

Accordingly, a volumetric display 10 is provided. By using the volumetric diffusor 20 to provide an illuminable location, and an array of electrowetting lenses 26 to direct light from the flat panel display 16 to the location, a true 3D display is provided without the complexity of spinning minors or other complications.

While this invention has been described in terms of the preferred embodiments thereof, it is not intended to be so limited, but rather only to the extent set forth in the claims that follow.

We claim:

1. A volumetric display for displaying three dimensional (3D) images, said volumetric display comprising:
    a flat panel display comprising a two dimensional array of pixels individually operable to emit light;
    a volumetric diffuser positioned proximate to the flat panel display and configured to define a display volume; and
    an array of electrowetting lenses interposed between the flat panel display and the volumetric diffuser, wherein each electrowetting lens is operable to direct light emitted by one or more of the pixels toward a location within the display volume such that the location is illuminated brighter than other locations within the display volume.

2. The volumetric display in accordance with claim 1, wherein the flat panel display is one of a liquid crystal display (LCD) and a light emitting diode display (LED).

3. The volumetric display in accordance with claim 1, wherein the volumetric diffuser comprises a transparent container filled with a mixture of powdered cornstarch suspended in water.

4. The volumetric display in accordance with claim 1, wherein the flat panel display and the array of electrowetting lenses cooperate to simultaneously illuminate a location with light passing through a plurality of electrowetting lenses.

5. The volumetric display in accordance with claim 1, wherein the flat panel display and the array of electrowetting lenses cooperate to time-multiplexingly illuminate a location with light passing through a plurality of electrowetting lenses.

* * * * *